United States Patent
Molzahn et al.

[19]

[11] Patent Number: 6,141,970
[45] Date of Patent: Nov. 7, 2000

[54] RELATING TO CONTAINERS

[75] Inventors: Stuart W. Molzahn, Derbyshire; John Lawrence, Birmingham; William Dando, Derbyshire, all of United Kingdom

[73] Assignee: Bass Public Limited Company, United Kingdom

[21] Appl. No.: 09/156,969

[22] Filed: Sep. 18, 1998

[30] Foreign Application Priority Data

Sep. 20, 1997 [GB] United Kingdom .................... 9720006
Sep. 20, 1997 [GB] United Kingdom .................... 9720009
Jan. 24, 1998 [GB] United Kingdom .................... 9801435

[51] Int. Cl.[7] ........................................ F25D 5/00
[52] U.S. Cl. .............................. 62/4; 62/48.2; 126/263.01
[58] Field of Search .................... 62/4, 48.2; 126/263.01

[56] References Cited

U.S. PATENT DOCUMENTS 3,972,201 8/1976 Datis .......................................... 62/48.2
4,784,678 11/1988 Rudick et al. ................................ 62/4
5,168,708 12/1992 Siegel ............................................ 62/4

*Primary Examiner*—Ronald Capossela
*Attorney, Agent, or Firm*—Michael D. Rechtin; Foley & Lardner

[57] ABSTRACT

A self cooling beverage container or can. In one embodiment water (26) is maintained at low pressure such that the boiling point is reduced. The water (26) is caused to boil and the vapour to be absorbed by a desiccant. The boiling of the water (26) causes heat to be absorbed from the beverage. The desiccant may be carbon (28). The water (26) or carbon (28) (or other chemicals) in one embodiment are maintained within a blind bore (30) within the container. The water and carbon are separated by a burstable membrane (42).

26 Claims, 4 Drawing Sheets

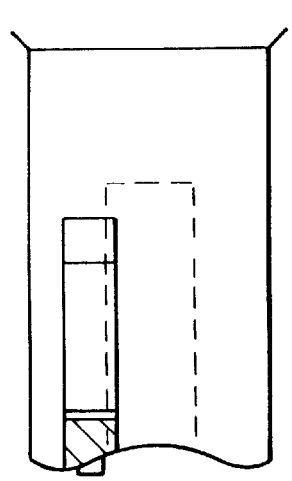
Fig. 9
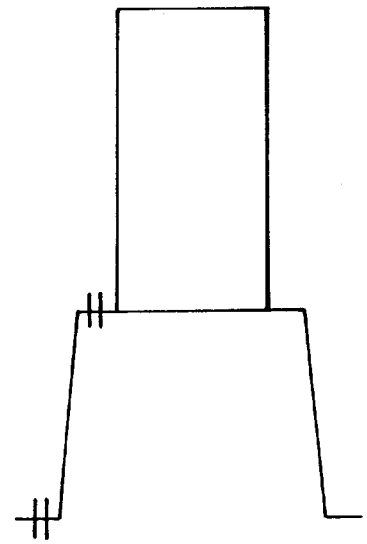
Fig. 10
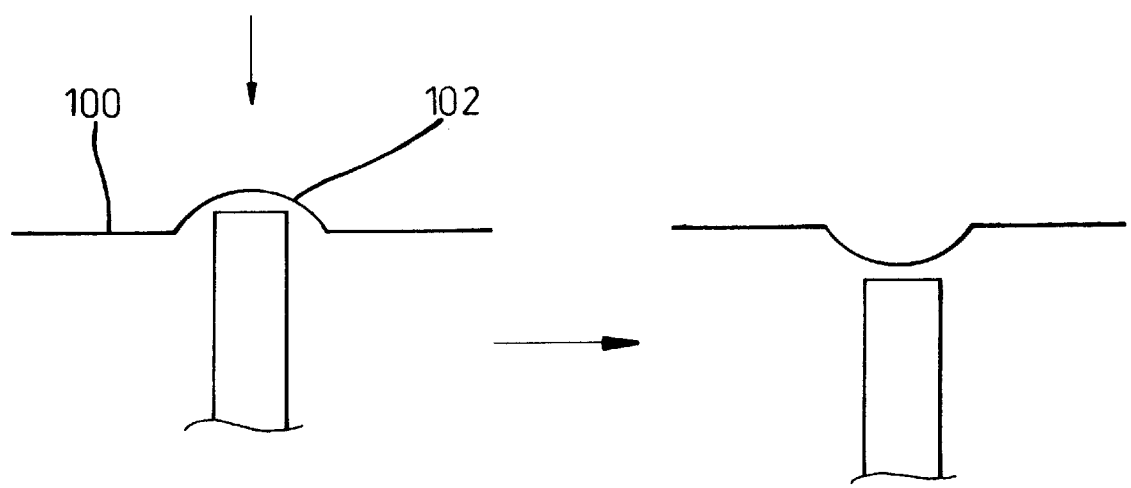
Fig. 11  Fig. 12

RELATING TO CONTAINERS

This invention relates to providing a self cooling container adapted to contain a beverage or other foodstuff and a method of cooling containers for beverages or other foodstuffs.

It is well known to provide beverages in drink containers such as cans. This has been performed for many years. Canning technology is well developed. It is also well known that consumers like to consume certain beverages only after that beverage has been chilled. This usually requires that the can be externally chilled and therefore requires cooling apparatus, such as a fridge, ice, etc. to allow the beverage to be cooled.

Clearly this can be a disadvantage if the consumer happens to be in a situation wherein none of these facilities are available. Perhaps, the consumer may be in a remote situation.

It would therefore be an advantage to provide a self cooling beverage container, such as a can, which can provide a consumer with a chilled beverage. Such a beverage container has been desired for some time but previously has not been realisable. Previous attempts have relied on the use of ozone destroying refrigerants which is clearly undesirable.

According to a first aspect of the invention there is provided a beverage, or other foodstuff, container which is provided with a cooling means adapted, in use, to chill a beverage, or foodstuff, contained within the container.

The beverage container may be a can.

Preferably the container looks like a standard container for that particular product. That is the container may look like a container which is usually used to hold that product but without the ability to chill the contents. This provides market continuity for the users of the product.

A cooling chamber may be provided which contains the cooling means so as to maintain the cooling means separate from the beverage contained within the container. An advantage of this is that contamination, or tainting, of the beverage is avoided.

The cooling chamber may be provided within the container. Alternatively, or additionally, the cooling chamber may be provided in association with the outside of the container (perhaps as a jacket, or similar).

Should the cooling chamber be provided within the can or other container it may be provided as a cylindrical chamber. This has the advantage that it is easy to fabricate, and is robust shape so that it can be readily adapted to withstand the pressures exerted upon it within a canning production process.

The cooling chamber may be provided as blind bore integrally formed in to lower end portion of a container or can. An advantage of this is that the resulting structure is cheap to manufacture and robust.

An external activation means may be provided on the can to activate the cooling means. This has the advantage that the activation means is readily accessible by a user.

Alternatively, an internal activation means may be provided which may operate when the beverage, or foodstuff, container is opened so providing a container which automatically cools the beverage within when it is opened.

An internal activation means may be operated by a drop in pressure as the container is opened. Such a drop in pressure is well known when cans containing carbonated beverages are opened.

The activation means may cause a membrane, divider, partition, bag, or other such device (hereinafter referred to as a membrane) which separates two chemicals (perhaps each contained in a separate portion of the cooling chamber) to rupture thus allowing the two chemicals to come into contact and the cooling process to begin.

One of the two chemicals may be water and the other of them an adsorbent or desiccant, such as activated carbon or a zeolite. The water and adsorbent are initially separated, and the adsorbent kept away from water vapour above a body of water. When the water vapour is allowed to contact the adsorbent it is adsorbed, reducing the partial pressure of water above the body of water and causing water to evaporate to replace the "lost" water vapour. This evaporation requires the input of heat and cools the beverage.

The membrane may comprise a burstable bag, or other similar volume containing structure, which separate the adsorbent/desiccant from the water vapour.

The membrane may be ruptured by a sharp barb, blade, or other similar structure, being causes to penetrate the membrane by the activation means. Alternatively, or additionally, the membrane may have a frangible joint which is caused to break by the activation means. In yet a further embodiment the membranes may be ruptured by a screw or other such helical device. A component of the cooling chamber (or in the cooling chamber) may be pulled or pushed against a disruption element to break the seal allowing the two chemicals to come into contact. In yet another embodiment a soluble membrane is provided which dissolves allowing the two chemicals to mix.

Another possible activation means may be the provision of a bellows type arrangement which when compressed, in use, cause the membrane to rupture. A plunger may be provided which when, in use, is pressed causes the membrane to rupture. All of these alternatives provide suitable mechanisms for allowing communication between the two chemicals.

The membrane means may comprise at least two plates, perhaps axially aligned and perhaps next to one another, each of which contains at least one hole or passage. In the inactivated state these holes or passages may be aligned, and the activation means may align the holes or passages. This alignment may allow the two chemicals to come into contact (perhaps by interconnecting two periods of a chamber, or two separate chambers).

In yet a further embodiment a rack and pawl actuation mechanism may be provided which can be repeatedly activated and thus inpart a movement of one of the parts of the mechanism relative to the other of the parts. Such a mechanism can prove useful in progressively acting upon a membrane; the relative movement of one of the parts can be utilised.

Perhaps the membrane may comprise a bag containing water and the rack and pawl mechanism can be used to burst the bag and subsequently act upon the bag, as the mechanism is repeatedly activated, thus ensuring that the contents of the bag are emptied.

A heat transfer means may be provided to ensure that more efficient heat transfer occurs between the cooling means and the beverage, or foodstuff, contained in the container.

The heat transfer means may comprise a cylinder with corrugated or grooved walls so as to provide a large area over which heat transfer can occur.

Preferably the heat transfer means is fabricated from a metal. A metal heat transfer means is advantageous because they can be cheap and yet have are good conductors of heat.

The heat transfer means may be the cooling chamber.

We may aim to use the evaporation of water (or another liquid) to provide the cooling effect. Preferably the evaporation of the water would be vacuum driven. The use of water is advantageous because water is non toxic, readily available and inexpensive.

By vacuum driving the evaporating of water we can get water to boil/evaporate quickly at room temperature—liquids boil at lower temperatures at lower pressures.

A desiccant material may be used in facilitate the reduction in pressure above liquid water (to promote evaporation of the water). Advantages of such a system are that the pressures involved are low, and also desiccant materials are relatively inexpensive.

The desiccant may be carbon (e.g. activated carbon), or calcium sulphate, or may be silica gel, or may be low density silica gel, or may be a zeolite. Each of these chemicals would exhibit the desired properties.

Insulation may be provided adjacent a desiccant or adsorbent material. Insulation can prevent heat released in a hydration process from reaching the contents of the container. Clearly, this is advantageous because this prevents the contents from being heated rather than cooled.

In still yet another embodiment the heat absorbed to evaporate a volatile liquid (other than water) may be utilised, or indeed the boiling of (or expansion of) a compressed gas may be utilised.

The beverage (or other foodstuff) container may be adapted to be recycled once the container has been used. The container may therefore contain only (or substantially only) materials which are readily recyclable and in the preferred embodiment the container may be manufactured from substantially only one material. It is obviously recognised that a small amount of other material (for instance sealing members, paints, lacquers, etc.) will need to be used in association with the container.

A pressuriseable beverage container may contain a recyclable self-cooling unit which is inserted into a can to allow the can to perform its self cooling function. The self-cooling unit may be insertable into and removable from the container.

Preferably the container is adapted, in use, to reduce the temperature of its contents by substantially between 5° C. and 20° C. Possibly by about between 9° C. and 15° C. In one embodiment the container reduces the temperature of its contents by at least 12° C. These ranges provide a suitable temperature drop so that the beverage, or foodstuff can be cooled from ambient temperature to a temperature at which they are pleasant to consume.

The contents of the container may be cooled to substantially between 4° C. and 10° C. Preferably the contents of the container are cooled to substantially between 6° C. and 8° C. Again the contents of the container may be pleasant to consume once they have been cooled to within this temperature range.

Ideally the cooling of the contents may take place in substantially 30 seconds, or 45 seconds, or 60 seconds, or 75 seconds, or 90 seconds, or 120 seconds or 180 seconds, or any intermediate time between these time periods. These time periods are believed to be the length of time a user of the container may find convenient to wait for the contents of the container to be cooled.

Preferably the volume of beverage or foodstuff which can be held within the container is substantially 270 ml, 300 ml or 330 ml. Of course other volumes may be allowable: perhaps 250 ml, 500 ml.

We have filed co-pending British Patent Application GB 9720006.7 and GB 9720009.1 which disclose various aspects relating to self cooling cans. The contents of these applications is incorporated by reference and the reader is directed to read these applications. One part of GB 9720006.7 discloses ways of breaking a membrane (or otherwise allowing two chemicals to mix).

According to a second aspect of the invention there is provided a method of cooling a beverage or foodstuff container.

The method may include using the evaporation of water or other liquid, or may use the evaporation of a volatile liquid.

The method may include mixing, or allowing to come into contact, a first and a second chemical to cool the contents of the container. The first chemical may be water vapour. The second chemical may be an adsorbent or desiccant.

The method preferably comprises using low pressure (below atmospheric pressure) to promote the evaporation of the water or other liquid, and may comprise providing the desiccant or adsorbent to reduce the pressure above the water or other liquid.

The method may comprise preventing heat generated in the adsorbent or desiccant from being released to the environment of the beverage container too quickly by thermally insulating the adsorbent or desiccant.

The method may utilise any of the features described in relation to the first aspect of the invention.

According to a third aspect of the invention there is provided an insert for a beverage, or foodstuff, container which, in use, cools the contents of the container.

According to a fourth aspect of the invention there is provided beverage, or foodstuff container, which has been filled with a beverage or foodstuff and also filled with an insert according to the third aspect of the invention.

According to another aspect of the invention we provide a packaged beverage comprising a container, beverage held in the container, and beverage cooling means being provided in, or in association with, the container and comprising a phase-change medium adapted in use to change phase and extract heat from the beverage.

Preferably adsorption or absorption means is provided in use to adsorb or absorb the phase-change medium.

Preferably, a cooling unit is provided and defines a vaporisation chamber, said phase-change medium vaporising into said chamber in use. The adsorption or absorption means is preferably provided so as to be communicable with said chamber. The cooling unit may comprise an in-can (or in-container) device.

Isolation means is preferably provided to isolate the adsorption or absorption means from the phase change medium until the cooling unit is activated via actuation means.

The actuation means may comprise a manually operable member, which may be a separate from any container-opening means that may be provided, or the actuation means may be arranged to operate upon opening of the container. For example, when the container is pressurised the cooling unit may be actuated by the change in pressure in the container that occurs upon opening the container. the cooling unit may be actuated by the change in pressure in the container that occurs upon opening the container.

The beverage preferably contains dissolved gas, such as (carbon dioxide and/or nitrogen). The beverage may be beer (beer we intend to cover beer proper, lager, ale, stout, porter, cider, and the like, and low alcohol or non-alcoholic drinks).

The isolation means may comprise an openable barrier which cannot be closed again (e.g. a rupturable membrane).

Preferably the phase change medium comprises water. The phase change medium may be substantially 100% water. The adsorbtion or absorption means may comprise activated carbon, a zeolite, or some other substance.

There may be low pressure provided in the cooling means above the phase change medium. A low pressure above a liquid makes it vaporise more readily (e.g. at room temperature).

By "low pressure" we mean below-atmospheric pressure, and preferably substantially below atmospheric pressure. In many embodiments of the invention "low pressure" is a pressure low enough so that the phase change means boils at temperatures experienced by a beverage in a can at room temperature, and even more preferably such that the liquid boils at 10° C., or 5° C., or even 2° C. or less (and even at sub zero temperatures). "Low pressure" may be vacuum, or practically vacuum.

The pressure in an inactivated cooling device above the liquid may be the partial pressure of that liquid at the temperature concerned.

A desiccant may be used in addition to or, instead of the adsorption means. If we can use something which has an endothermic reaction when it adsorbs/absorbs water this effect can also be used to cool the contents of the container. Ammonium nitrate is cheap and has an endothermic reaction. We may provide ammonium nitrate in the adsorption means, at least as one component.

We may provide a "splash protector" which allows the passage of vapour but restricts or prevents the passage of liquid. A baffle, or series of baffles may do this. It may be possible to have a "no-wetting" device which protects the adsorption means from direct contact with liquid but allows vapour to pass. This could be useful should a user activate the cooling unit and then knock the can (or other container) over, or invert it. The "no-wetting" device may keep the adsorption/absorption means dry for only a few seconds or tens of seconds, or it may keep it dry for hours or days (when liquid would otherwise contact the adsorption means).

We may provide thermal insulation adjacent the adsorption means. We may provide a thermal insulating barrier in the wall that defines the vaporisation chamber. We prefer to have a good thermal conduction (e.g. metal) between the phase change medium (liquid) and the beverage, so as to facilitate heat extraction from the beverage.

The cooling unit may be attached to the top wall of a container, or the bottom wall, or a side wall, or may be loose inside the container, e.g. free-floating.

According to another aspect of the invention we provide a cooling unit adapted to cool beverage in a container, the unit comprising a phase change medium adapted to change phase and extract heat from the beverage.

When the cooling unit is activated and the adsorption or absorption means is in communication with vapour from the phase change means these phase change means may experience a pressure that is such that the phase change medium vaporises (vaporises enough to get significant cooling), and preferably boils, at 20° C. or less, 15° C. or less, (0° C. or less, 5° C. or less, about 0° C., or less).

According to another aspect of the invention we provide a kit comprising at least one, and preferably a plurality of, beverage containers containing a beverage, and at least one cooling unit.

It will be appreciated that although we have discussed cooling beverages, and that is our main area of intended use, the invention is applicable to cooling other foodstuffs (e.g. ice-cream, yoghurt etc.). We seek protection for such a broader invention.

We may not adsorb or absorb the heat transfer medium. It may escape to atmosphere, or it may be removed from the vaporisation chamber (to allow more liquid to vapour phase change to occur) and be stored in storage means which may or may not adsorb or absorb (and may re-condense).

Embodiments of the invention will be described by way of example only with reference to the accompanying drawings, or which FIG. 1 shows a packaged beverage having a self-cooling unit;

FIG. 9 shows a cooling device mounted on the base of a can;

FIG. 10 shows a combined cooling device and head-generation widget adapted for retention in the can; and FIGS. 11 and 12 show a way of operating/actuating a cooling device.

Figure 1:
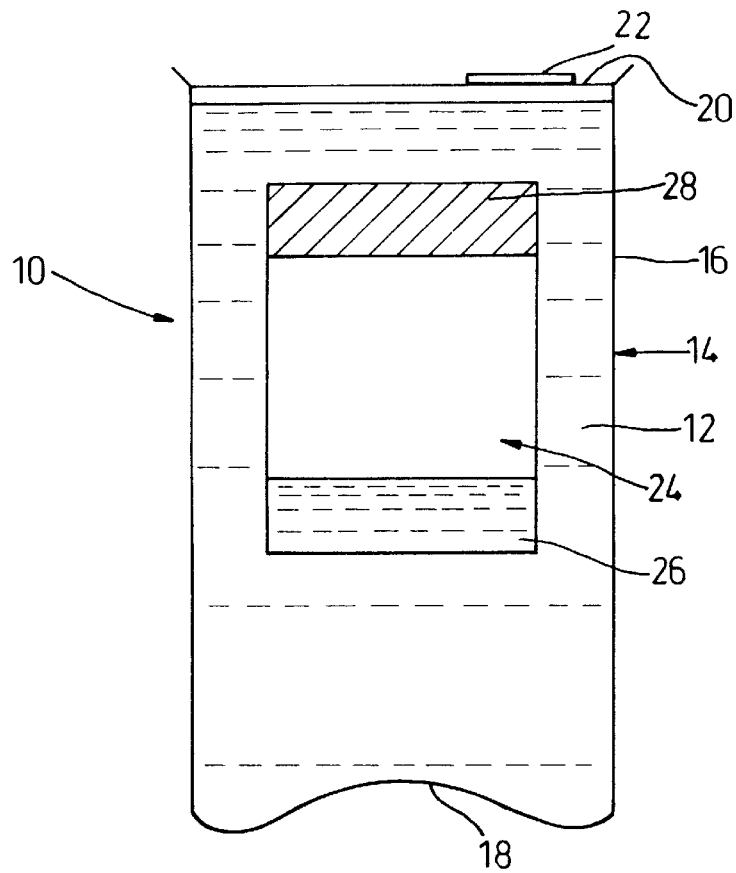

FIG. 1 shows a packaged beverage 10 comprising beer 12 contained in a can 14 having cylindrical side wall 16, a domed base wall 18, a can end 20, and a manually-operable can aperture 22. A self-cooling device, or unit, 24 is provided in the can. In FIG. 1 the unit 24 is shown in the middle of the can not attached to anything, but this is schematic: it would usually be attached to a wall of the can. The size of the unit 24 is also probably shown as being larger than it is likely to be in practice.

The self-cooling unit 24 has water 26 and an adsorbent 28, such as activated carbon or a zeolite, or calcium sulphate, or ammonium nitrate, or silicon gel, which adsorbs water vapour.

When water vapour (not shown) is adsorbed by the adsorbent 28 the pressure above the body of water 26 is lowered and more water evaporates to replace the adsorbed water. This cools the body of water 26, and hence the beverage. It will be appreciated that some way of keeping the water vapour from the adsorbent must be provided until it is desired to actuate the self-cooling device 24, this way being termed "isolation means" (not shown in FIG. 1).

Figure 2:
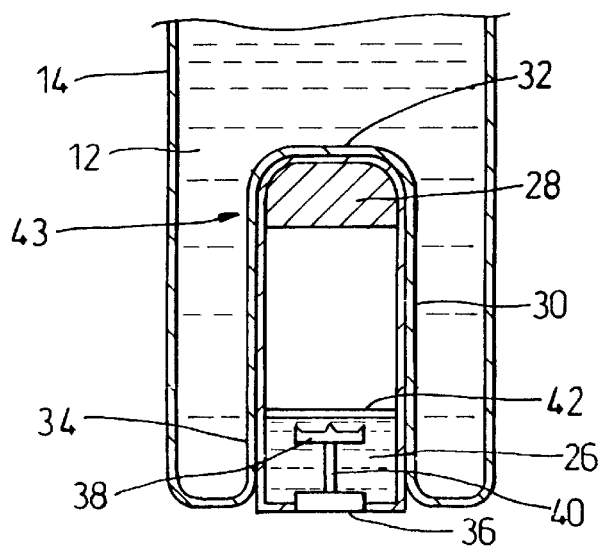
FIG. 2 shows a can of beer provided with another self-cooling unit.

FIG. 2 shows a can having an axially extending internal recess defined by an axial portion 30 of its base wall 18. The cooling unit and a transverse portion 32 of is received in the recess and has close thermal contact with the can, at least in regions 34 that are adjacent the water.

As a modification of FIG. 2 it may be better to have the water where the adsorbent is shown (deep within the can), and the adsorbent where the water is shown (near the exterior of the can). This may enable the area where heat is extracted from the beverage to be in the body of the beverage, rather than near the boundary of the beverage. Of course, some way of allowing water vapour to pass (after opening or rupture of the isolation means), but as still retaining liquid water at the inner end of the recess of keep the cooling there and to prevent contact of liquid water with the adsorbent would usually be provided. The self-cooling unit would preferably have metal walls for thermal conduction, but the wall near the adsorbent/in the region of the adsorbent may be of an insulating material, such as plastics.

FIG. 2 shows an actuation mechanism comprising a push button 36 which when activated allows communication between water vapour and the adsorbent. In this example, a cutter 38 is urged by a strut 40 to break a membrane 42.

Figure 3:
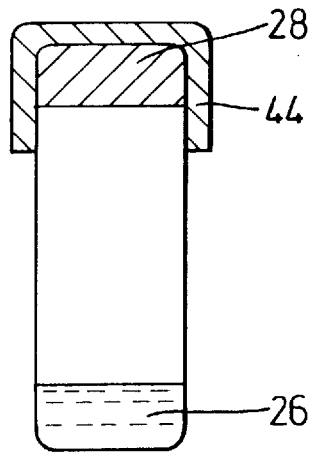
FIG. 3 shows a modified beverage cooling device having insulation around adsorbent material.

FIG. 3 shows a self-cooling unit (isolation means not shown) having insulation 44 around the adsorbent material. The wall of the vessel holding the water and adsorbent may be metal in the region of the water and plastic in the region of the adsorbent.

Figure 4:
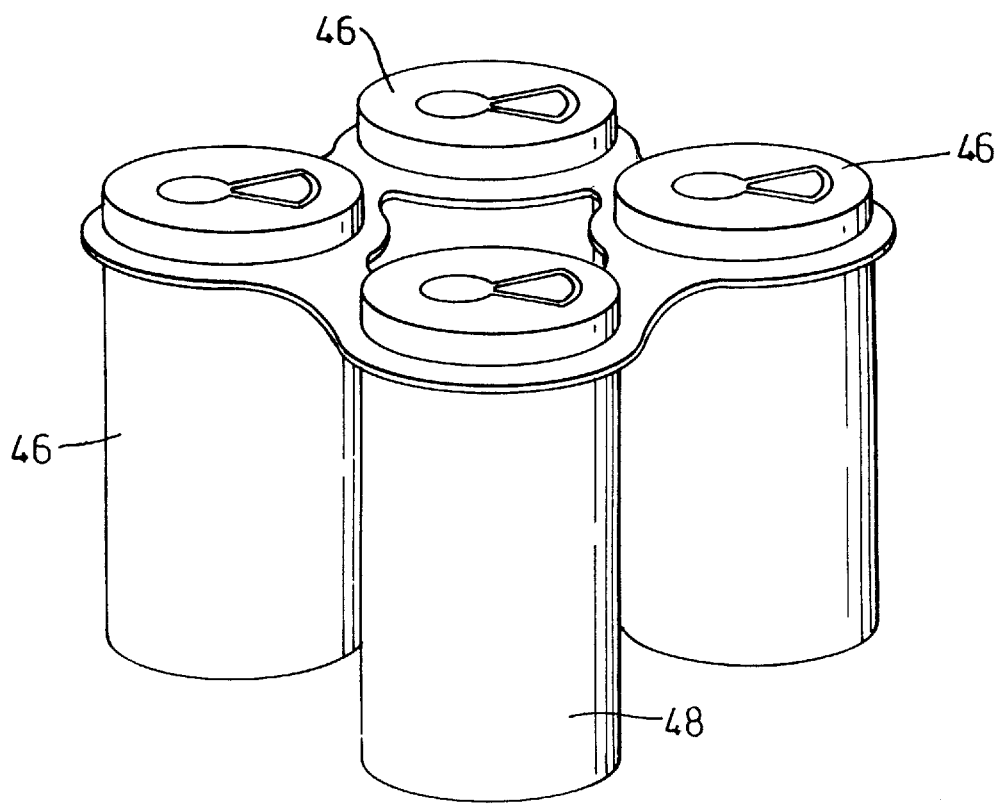
FIG. 4 shows a multi-pack of cans, one of which having a self-cooling unit.

FIG. 4 shows a multi-pack having three normal cans of beverage 46 and one can 48 of beverage having a self-cooling unit. The cans are substantially the same size and shape.

Figure 5:
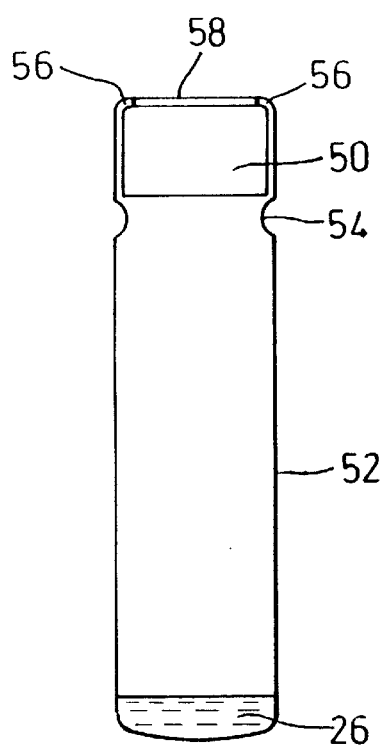
FIG. 5 shows a cooling device with an adsorbent/absorbent insert cartridge.

FIG. 5 shows a cartridge 50 of adsorbent retained in a metal tube 52. An inwardly-projecting nip, or groove, 54 holds the cartridge 50 against inwardly-directed flanges 56. An aperture 58 in the tube allows the cartridge to be introduced into the tube, and then the flanges 56 are bent over to reduce the size of the aperture and hold the cartridge in place.

In FIG. 5 the cartridge 50 of adsorbent material may be held in a separate housing (e.g. of steel coated in lacquer, or plastics material) defining a closed chamber by the "nip" 54. It may be convenient for us to provide the adsorbent material in a self-contained cartridge and locate/affix this in the tubular body/other body. In FIG. 5 the tubular body fully encloses the cartridge, but in other embodiments it may seal to it, and the wall of the cartridge may provide the exterior surface of the cooling unit. The cartridge may have provided associated with it/integral with it the isolating barrier. For example, the cartridge may be moulded in plastics material and may have a thin film moulded in it which constitutes the isolating barrier. A mechanism may be provided to break the thin film in order to activate the cooling unit.

Figure 6:
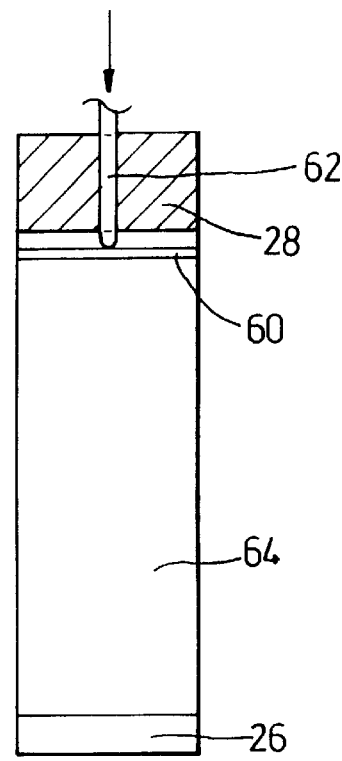
FIG. 6 shows a cooling device with an openable barrier provided adjacent adsorbent/absorbent material.

FIG. 6 shows a thin breakable membrane 60, comprising the isolating barrier, provided immediately adjacent the adsorbent material 28, and shows a plunger 62 that is operated so as to break the membrane so as to activate the unit. Water vapour exists in space 64.

Figure 7:
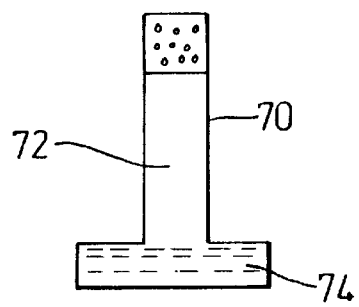
FIG. 7 shows an alternative shape for a cooling device.

FIG. 7 shows a housing 70 defining a closed chamber 72, but in this case the housing is not simply a cylindrical tube. The housing has an enlarged lower portion 74, which is this example is shown as a hollow disk. The level of evaporating liquid in the unit before use is roughly the same as the height of the disk, enlarged, portion of the unit. The isolation means is not shown.

The enlarged portion 74 may have greater heat exchange capability with the surrounding beverage (than a cylinder of uniform cross-section). In order to improve heat exchange we may provide fins/other surface-area enlarging structures.

It is probably more important to provide these features/ the capability for a high rate of heat exchange, in the area of the housing that contacts the liquid water, rather than in an area which only contacts vaporised gas.

Figure 8:
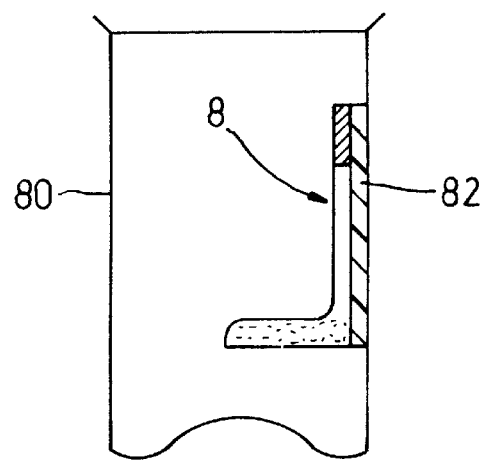
FIG. 8 shows another alternative shape for a cooling device, and an alternative place of mounting it in a can.

FIG. 8 shows another can, referenced 80, in which a plastics insulating member 82 is attached to the sidewall of the can (for example by adhesive, such as a two-part adhesive suitable for use in food systems), and a self-cooling unit 84 is mounted to the side of the can, via the insulating member 82. Indeed, gluing the self-cooling unit to the can is one way of attaching it, whatever the shape or arrangement of the unit.

The cooler unit need not necessarily be mounted to the can end, and need not necessarily have its actuation means provided on the top or the bottom of the can—it could be at the side of the can, but we prefer to provide it at the top.

FIG. 8 also shows another enlarged portion of the housing of the cooler unit.

FIG. 9 shows another can with the cooling unit provided on the bottom of the can at the base wall. A cooler unit could be provided off-set, as shown, or centrally 9 (as shown in dotted outline). The actuation button for the cooler unit is received with the closed recess at the base of the can and does not project beyond the sidewalls of the can. This facilitates stacking of cans and reduces the risk of setting the can off accidentally. A safety pin, or other manually-operable release device may be provided to prevent accidental triggering of the device.

FIG. 10 shows a combined cooling unit and head-generation widget. As will be appreciated, it is well-known to provide devices in cans to help generate a head when the can is opened, and the contents poured. The mounting of such widgets to the cans is a problem that has already been solved. We envisage "piggy-backing" a cooling device on a widget, so that the cooling device does not have to be separately mounted. This is especially attractive if the cooling device is operable by a change of pressure. The widget and cooling device could be an integral combined device.

The widget of FIG. 10 is the widget of Bass Pic, and is a plastic "top-hat" widget having holes at different axially spaced positions, and is adapted to be glued to the domed base wall of the cam. Of course, a metal widget can be used, or any other widget of any other manufacturer.

We may even provide the cooling device and the widget integrally moulded, or otherwise formed as one piece. This would reduce manufacturing costs, and reduce costs in comparison with inserting two separate components as two separate exercises into the can. This last effect can be achieved by having two discrete units attached together, and inserting them as a single unit.

FIGS. 10 and 12 show one possibility of actuating a cooler unit. A wall of a container, reference 100, has a bistable portion 102 which can be moved from a first condition to a second condition manually by a user, and in so doing moves an element within a can to open the isolating barrier. To move to the second stable position the bistable area 102 maintains the isolating barrier open. Instead of a bistable area the can may simply have a flexible region.

Alternatively, there may simply be a region provided on a can which can be flexed by a user (e.g. by his finger or thumb) so as to open/break the isolating barrier. That region may be returned to its original condition after it has been flexed (e.g. it may spring back), or it may stay in a "used" position.

The liquid (e.g. water) may be completely evaporated after, say, 5, 10, 15, 20, 30, 40 or more seconds. The adsorbent material may be saturated before all of the liquid is evaporated.

We may arrange the performance of the liquid to be such that in a standard 440 ml can, or even a 500 ml can, we can expect a temperature drop of the beverage of at least 10° C., and preferably at least 12°, 14°, 16°, 18° or even 20° C. We would probably arrange things such that we do not get a temperature drop of any more than 20° C. (or even a bigger drop than 15° C.) since we may not wish to freeze the beverage, at least when used in beer or soft drinks.

It will be noted that the isolation means membrane may be provided close to the water. This maximises the available heat extraction due to expansion of gas.

In order to prevent a consumer experiencing the heat (and possibly burning themselves) created by the adsorbent material, we may well insulate the adsorbent from the can end (or indeed any part of the can). Again, in order to prevent the transfer of heat of adsorption back down the wall of the self-cooling unit we may provide a plastic, or other insulating, ring in the wall of the tube, breaking the metal-to-metal conduction path. The tubular chamber-defining walls of the self-cooling unit may be defined by two components, a plastics component (poor thermal conductor) and a metal component (good thermal conductor). This enables good thermal communication with the beverage at the region where heat is being extracted—in the region of the liquid water, and yet insulates the area which may make it hot.

The housing of the cooling device may be predominantly metal, but has a plastic "washer" in its wall to provide a thermal break. The beverage may be above the lowermost level of the adsorbent material if it is thermally insulated.

We may used the reduction in the pressure of the can when the can is opened to open the isolating barrier for example, we may use it to tear the membrane. A component of the cooling unit could be pressurised by, for example, internal pressure/bias spring/by pressure-generation means, which pressure is countered by the above-atmosphere pressure in a closed container. When the pressure in the container falls to atmospheric pressure, due to the container being opened, the actuator is actuated.

The beverage container may be a single use disposable container, or we may provide the container in a form adapted to be re-used or recycled. A customer may be encouraged to return a used container to us for recycling. We may be able to reuse the container or reuse the cooling mechanism. The container may comprise a beverage (or foodstuff) chamber adapted to be coupled to a cooling cartridge. The self-cooling unit or cartridge may be releasable from the container after the unit has been used (possibly by destroying the container). We may be able to re-activate the cooling cartridge and reuse it.

We may simply receive used containers and separate out the container bodies and self-cooling cartridges for independent recycling/waste disposal. This gives us the control over how the spent cartridges are recycled or disposed of.

The beverage (or foodstuff) container may be refillable with beverage (or foodstuff) and may be reusable.

If we have the used cans returned to us we can control their disposal/recycling. As an incentive to return the cans/containers we may have a refund of part of the purchase price, or discount off the next full container. The containers may include competition/prize-winning means indicative of winning a possible prize, such means preferably only being evaluatable at a recycling station to see if the possible prize has actually been won.

For the avoidance of doubt, we also seek protection for a can or other container part-way through production that has no beverage in it, but does not a self-cooling unit. We also seek protection for a self-cooling unit adapted to be incorporated in a beverage container.

Our foodstuffs beyond beverages to which the present invention is applicable include yoghurts and ice-cream.

Although the cooling mechanism described has been provided as an insert, it could be integrally provided with the can or other container, or provided in some other non-insert way. We also seek protection for such non-insert containers (filled with beverage or food, or unfilled).

We may provide trap means initially provided at a low pressure (possibly an evacuated chamber), into which vapour is released. The trap means may have adsorption, or pressure-reducing, means adapted to hold gas.

The adsorption means both prevents evaporated gas from reaching atmosphere and reduces the pressure of gas above the body of liquid, thereby facilitating more evaporates of liquid.

Adsorbing phase-change liquid (e.g. water) means that we do not release it to atmosphere, and the partial pressure of gas above the body of liquid is kept relatively low. Indeed, adsorbing the gas may well be a way of reducing the pressure above the body of liquid to below atmospheric pressure, thereby assisting in the evaporation of the liquid itself (to be adsorbed).

What is claimed is:

1. A beverage container adapted to hold a beverage, said container having a cooling chamber therein containing a first and a second chemical, said second chemical being held in a first portion of said cooling chamber thermally insulated from said beverage, said first chemical being held in a portion of said cooling chamber separated from said first portion by a membrane, rupturing means being provided to rupture said membrane allowing the first and second chemicals to mix, said first chemical being water and said second chemical being carbon, the cooling chamber being provided in a combined unit with a head generator, said generator generates a head when said container is opened, said combined unit being provided within said container.

2. A container according to claim 1 which is a can.

3. A container according to claim 1 in which said cooling chamber is provided as a cylindrical chamber.

4. A container according to claim 1 in which an internal activation means is provided which operates when the beverage or foodstuff container is opened, rupturing said membrane.

5. A container according to claim 4 in which the activation means is operated by a drop in pressure as said container is opened.

6. A container according to claim 1 in which a manually-operable external activation means is provided on said container to rupture said membrane.

7. A container according to claim 1 in which said membrane comprises a burstable bag, or other similar volume containing structure.

8. A container according to claim 1 in which said membrane is ruptured by a sharp barb, blade, or other similar structure.

9. A container according to claim 1 in which said membrane is ruptured by a screw or other such helical device.

10. A container according to claim 1 in which a component of said cooling chamber (or in the cooling chamber) is pulled or pushed against a disruption element to break said membrane.

11. A container according to claim 1 in which said membrane comprises at least two plates, aligned, next to one another, each of which contains at least one hole or passage.

12. A container according to claim 11 in which alignment, in use, of the holes, or passages, equates to failure of said membrane and allows matter to pass.

13. A container according to claim 1 which has a bellows, which when activated ruptures said membrane.

14. A container according to claim 1 in which a heat transfer means is provided to ensure that more efficient heat transfer occurs between said cooling chamber and said beverage, or foodstuff, contained in said container.

15. A container according to claim 14 in which said heat transfer means comprises a cylinder with corrugated or grooved walls.

16. A container according to claim 14 in which said heat transfer means is said cooling chamber.

17. A container according to claim 1 in which said container is adapted, in use, to reduce the temperature of its concerns by substantially between 5° and 19° C.

18. A container according to claim 1 in which the volume of beverage or foodstuff which can be held within the container is substantially 330 ml.

19. A beverage container adapted to hold a beverage, said container having a cooling chamber therein containing a first and a second chemical, said second chemical being held in a first portion of said cooling chamber thermally insulated from said beverage, said first chemical being held in a portion of said cooling chamber separated from said first portion by a membrane, rupturing means being provided to rupture said membrane allowing the first and second chemicals to mix, said first chemical being water and said second chemical being carbon, said container being defined by a wall with said wall having a bistable portion that can be moved from a first condition to a second condition manually by a user, with said membrane being ruptured by said movement.

20. A container according to claim 19 in which said membrane comprises a burstable bag, or other similar volume containing structure.

21. A container according to claim 19 in which said membrane is ruptured by a sharp barb, blade, or other similar structure.

22. A container according to claim 19 in which said membrane is ruptured by a screw or other such helical device.

23. A container according to claim 19 in which a heat transfer means is provided to ensure that more efficient heat transfer occurs between said cooling chamber and said beverage, or foodstuff, contained in said container.

24. A container according to claim 23 in which said heat transfer means comprises a cylinder with corrugated or grooved walls.

25. A container according to claim 19 in which the volume of beverage of foodstuff which can be held within the container is substantially 330 ml.

26. A beverage container adapted to hold a beverage, said container having a cooling chamber therein containing a first and a second chemical, said second chemical being held in a first portion of said cooling chamber thermally insulted from said beverage, said first chemical being held in a portion of said cooling chamber separated from said first portion by a membrane, rupturing means being provided to rupture said membrane allowing the first and second chemicals to mix, said first chemical being water and said second chemical being carbon, a splash protector being provided adapted to restrict passage of said water into said first portion.

* * * * *